United States Patent
Schmid et al.

(10) Patent No.: US 10,236,524 B2
(45) Date of Patent: Mar. 19, 2019

(54) METHOD FOR PURGING A FUEL CELL AND DEVICE FOR CARRYING OUT SAID METHOD

(71) Applicant: Bayerische Motoren Werke Aktiengesellschaft, Munich (DE)

(72) Inventors: Johannes Schmid, Munich (DE); Norbert Frisch, Planegg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 75 days.

(21) Appl. No.: 15/227,048

(22) Filed: Aug. 3, 2016

(65) Prior Publication Data
US 2016/0344047 A1   Nov. 24, 2016

Related U.S. Application Data

(63) Continuation of application No. PCT/EP2015/055309, filed on Mar. 13, 2015.

(30) Foreign Application Priority Data

Apr. 17, 2014   (DE) .................. 10 2014 207 450

(51) Int. Cl.
| | |
|---|---|
| *H01M 8/04111* | (2016.01) |
| *H01M 8/04119* | (2016.01) |
| *H01M 8/04223* | (2016.01) |
| *H01M 8/04828* | (2016.01) |
| *H01M 8/04955* | (2016.01) |

(52) U.S. Cl.
CPC .... *H01M 8/04253* (2013.01); *H01M 8/04111* (2013.01); *H01M 8/04164* (2013.01); *H01M 8/04231* (2013.01); *H01M 8/04835* (2013.01); *H01M 8/04843* (2013.01); *H01M 8/04955* (2013.01)

(58) Field of Classification Search
CPC ................ H01M 8/04231; H01M 8/04179
See application file for complete search history.

(56) References Cited

U.S. PATENT DOCUMENTS

| | | | | |
|---|---|---|---|---|
| 7,354,669 | B2 * | 4/2008 | Hobmeyr | H01M 8/04097 429/415 |
| 2004/0062975 | A1 | 4/2004 | Yamamoto et al. | |
| 2004/0101734 | A1 * | 5/2004 | Morishima | H01M 8/04231 429/415 |
| 2004/0219401 | A1 | 11/2004 | Hobmeyr et al. | |
| 2005/0031917 | A1 * | 2/2005 | Margiott | H01M 8/04201 429/429 |

(Continued)

FOREIGN PATENT DOCUMENTS

| | | |
|---|---|---|
| CN | 103715440 A | 4/2014 |
| DE | 103 54 907 A1 | 6/2004 |

(Continued)

OTHER PUBLICATIONS

Machine Translation of EP 1482588 A1 (Mar. 20, 2018).*

(Continued)

*Primary Examiner* — Matthew J Merkling
(74) *Attorney, Agent, or Firm* — Crowell & Moring LLP (57) ABSTRACT

A method is provided for purging a fuel cell. The method is characterized by suctioning the purge gas through the fuel cell by use of low pressure.

6 Claims, 4 Drawing Sheets

(56) References Cited

U.S. PATENT DOCUMENTS

| | | | | |
|---|---|---|---|---|
| 2005/0142399 A1* | 6/2005 | Kulp | ............... | H01M 4/926 |
| | | | | 429/429 |
| 2008/0245588 A1* | 10/2008 | Wake | ............... | H01M 8/04179 |
| | | | | 180/65.31 |
| 2009/0104480 A1 | 4/2009 | Machuca et al. | | |
| 2010/0310955 A1* | 12/2010 | Yadha | ............... | H01M 8/04231 |
| | | | | 429/429 |
| 2012/0201715 A1 | 8/2012 | Tsukabayashi et al. | | |
| 2014/0093801 A1 | 4/2014 | Rogahn et al. | | |

FOREIGN PATENT DOCUMENTS

| | | | |
|---|---|---|---|
| DE | 103 14 820 A1 | 12/2004 | |
| DE | 60 2004 000 440 T2 | 8/2006 | |
| EP | 1482588 A1 * | 12/2004 | ........ H01M 8/04111 |
| JP | 2005/259458 A | 9/2005 | |
| KR | 10-2008-0046025 A | 6/2008 | |

OTHER PUBLICATIONS

Chinese-language Office Action issued in counterpart Chinese Application No. 201580004292.9 dated Jan. 2, 2018 with English translation (12 pages).

International Search Report (PCT/ISA/210) issued in PCT Application No. PCT/EP2015/055309 dated Jul. 7, 2015 with English translation (five pages).

German-language Written Opinion (PCT/ISA/237) issued in PCT Application No. PCT/EP2015/055309 dated Jul. 7, 2015 (six pages).

German Search Report issued in counterpart German Application No. 10 2014 207 450.9 dated Nov. 17, 2014 with partial English translation (13 pages).

Chinese Office Action issued in Chinese counterpart application No. 201580004292.9 dated Aug. 20, 2018, with partial English translation (Sixteen (16) pages).

* cited by examiner

Prior Art

METHOD FOR PURGING A FUEL CELL AND DEVICE FOR CARRYING OUT SAID METHOD

CROSS REFERENCE TO RELATED APPLICATIONS

This application is a continuation of PCT International Application No. PCT/EP2015/055309, filed Mar. 13, 2015, which claims priority under 35 U.S.C. § 119 from German Patent Application No. 10 2014 207 450.9, filed Apr. 17, 2014, the entire disclosures of which are herein expressly incorporated by reference.

BACKGROUND AND SUMMARY OF THE INVENTION

The present invention relates to a method for purging a fuel cell for the purposes of reducing the water content in the fuel cell, and to a device for carrying out the method.

For a successful frost start of a fuel cell system, it is necessary to reduce the amount of water contained in a fuel cell or in a fuel cell stack of the fuel cell system, in order to prevent freezing of the water therein and in order to lower a thermal capacity of the fuel cell system, For this purpose, in the prior art, the fuel cell system is blown dry upon being shut down. The moisture content may, for example, be reduced in that, after the deactivation of the fuel cell or of the fuel cell system, the operation of the compressor is continued for a certain period of time in order to extract moisture from the fuel cell. This approach is also referred to as follow-on running or "blow down". Owing to the pressure conditions prevailing in the fuel cell system, this method is however inefficient, and adequate drying of the system is scarcely possible.

DE 60 2004 000440 T2 discloses a fuel cell drive unit having a motor-compressor assembly for supplying compressed air to the fuel cell, wherein the direction of rotation of the motor-compressor assembly can be reversed.

Proceeding from the prior art, it is an object of the present invention to provide a method for purging a fuel cell, by way of which method the amount of water in the fuel cell can be reduced in a simple and efficient manner. It is also an object of the present invention to provide a device for carrying out the method, which device is also suitable for a frost start or allows for a shut-down strategy in preparation for the frost start. It is also a preferred object of the technology disclosed herein to prepare the fuel cells for the next cold start or frost start, without harmful gases or contaminants, for example introduced particles, passing into the fuel cell in the process. Moreover, it is an aspect of the technology disclosed here to increase safety during the follow-on running and to reduce any emissions (noise, water).

These and other objects are achieved by a method for purging a fuel cell, which method has the step of suctioning purging gas through the fuel cell by way of negative pressure. By way of the suctioning of purging gas, the absolute pressure acting in the fuel cell is reduced in relation to a situation in Which purging gas is blown through the fuel cell. In this way, the liquid water contained in the fuel cell is evaporated at a lower temperature, and drying is thus achieved very quickly and easily. The purging gas is not restricted in terms of its detail. Purging gas is generally the gas which is purged through the fuel cell in order to reduce the amount of water after the "blow down" operation of the fuel cell, without this serving the purposes of the electrochemical reaction in the fuel cell. In the present case, the purging is performed by suctioning. It is, however, preferable for fresh air to be used as purging gas, because material costs for the purging gas are thus omitted, and fresh air is freely accessible almost everywhere. The method according to the invention is extremely highly suited to fuel cell systems with one fuel cell or with a fuel cell stack, wherein the method can be performed inexpensively, without a high level of technical outlay, and in a short time.

In one advantageous refinement of the method according to the invention, in order to generate the negative pressure, a delivery device which supplies cathode gas to the fuel cell is reversed in terms of its delivery direction. This may be realized most easily by electronic means. Cathode gas is in this case generally the gas which is supplied to the fuel cell during the normal or standard operation of the fuel cell (that is to say not during the follow-on running phase) for the electrochemical fuel cell reaction.

It is advantageous for the entire air path of the fuel cell to be briefly reversed in terms of its delivery direction. Purging gas, which includes fresh air, may in this case be suctioned in from surroundings of the fuel cell and supplied for example via an inlet air filter. The amount of fresh air to be delivered, and the pressure level thereof, may preferably be controlled by way of a throttle flap. The delivery device is preferably a compressor operated in the reverse direction, which compressor supplies cathode gas to the fuel cell during normal use. This embodiment of the method requires substantially no structural changes to the fuel cell system, and is therefore preferable in particular with regard to the costs for carrying out the method.

A further advantageous refinement provides that, for the generation of the negative pressure, a delivery direction in the fuel cell is reversed. This relates in particular to the cathode path of the fuel cell. In this way, the fuel cell can be purged in a highly effective manner.

It is furthermore advantageous for purging gas to be suctioned in via a fuel-cell exhaust-gas line. Since the fuel-cell exhaust-gas line is connected directly to the fuel cell to be purged, no separate purging-gas supply is required in order to deliver, in particular, fresh air from the fuel cell surroundings. The suctioning-in may in this case take place directly from the fuel-cell exhaust-gas outlet or via a supply line which opens into the fuel-cell exhaust-gas line.

From the aspect of a simple method implementation, the purging gas is preferably suctioned in via a fuel-cell exhaust-gas outlet. During the normal operation of the fuel cell, the fuel-cell exhaust-gas outlet conveys anode exhaust gas, cathode exhaust gas or fuel cell mixed exhaust gas, which may also contain water, into the surroundings. It may thus duly be the case that, initially, water-containing exhaust gas is suctioned in through the fuel cell by negative pressure, but mixing with suctioned-in fresh air is possible already in the fuel-cell exhaust-gas line, such that fast and simple drying of the fuel cell is achieved. To reduce or prevent water-containing fuel cell exhaust air from being suctioned in, it is particularly preferably possible for the normal delivery direction to initially be maintained for a few seconds, preferably for 1 to 10 seconds, in particular for 2 to 5 seconds, after the shutdown of the fuel cell before purging gas is suctioned in via the fuel-cell exhaust-gas outlet.

Alternatively or in addition thereto, purging gas may be suctioned in via a purging-gas supply that is additionally provided in a cathode-gas supply of the fuel cell. An advantage of this is that fresh air can be suctioned through the fuel cell by way of negative pressure immediately, without water-containing fuel cell exhaust air having to be conveyed. The drying time of the fuel cell is reduced in this way. For this embodiment of the method according to the invention, the delivery device is operated in the normal direction.

It is furthermore advantageously provided that the purging gas that is suctioned through the fuel cell is delivered out via a cathode-gas supply. This promotes a fast expulsion of now humidified purging gas from the fuel cell system.

For further simplification of the method, the purging gas that is suctioned through the fuel cell is delivered out via a purging-gas outlet which is provided in a cathode-gas supply of the fuel cell.

For further shortening of the drying time, water is condensed out of the fuel cell exhaust air and/or out of the purging gas before the suctioning through the fuel cell.

Likewise specified according to the invention is a device for carrying out the method described above. The device is, for example, a fuel cell system and includes at least one fuel cell having a cathode-gas supply for the supply of cathode gas to the fuel cell and having a fuel-cell exhaust-gas line for the delivery of anode exhaust gas, cathode exhaust gas or fuel cell mixed exhaust gas out of the fuel cell. In the cathode gas supply there is provided a delivery device, in particular a compressor, which is designed to generate negative pressure in the fuel cell and to suction purging gas through the fuel cell. By way of the embodiment of the device according to the invention, which permits suctioning of purging gas rather than forcing of purging gas through the fuel cell by way of high pressure, drying of the fuel cell is possible within an extremely short time, and a fuel cell with good frost start characteristics can be provided.

The advantages, advantageous effects and refinements presented for the method according to the invention also apply to the device according to the invention for carrying out the method.

With regard to a simple component arrangement, the delivery device is a cathode-gas delivery device for supplying cathode gas to the fuel cell, which cathode-gas delivery device is operated in a reverse delivery direction. This is easy and inexpensive to implement by way of electronic control. It is furthermore possible to dispense with additional delivery devices and to provide a device which has a minimum number of functional components.

A further advantageous refinement provides that the device furthermore includes a purging-gas supply and/or a purging-gas outlet, which are arranged in the cathode-gas supply between the delivery device and the fuel cell. It is thus possible for the delivery device to be operated in a normal delivery direction, and for purging gas to nevertheless be suctioned through the fuel cell with high efficiency. The operation of the delivery device in the normal delivery direction is particularly advantageous with regard to the geometric arrangement of the delivery device components configured in the delivery direction, normally blade geometry, and a thus increased delivery rate.

Further advantageously, the device according to the invention includes a first bypass line and/or a second bypass line, wherein the first bypass line connects the fuel-cell exhaust-gas line and the cathode-gas supply downstream of the delivery device, and wherein the second bypass line connects the cathode-gas supply downstream of the delivery device to the cathode-gas supply upstream of the delivery device. In this way, from a structural aspect, simple delivery paths are provided for the purging gas to be suctioned through the fuel cell, without major intervention into the architecture of the device.

For simplification of the control of the flow direction of the purging gas, the first bypass line and the second bypass line are connected to one another by way of a multi-way valve.

To reduce the time required for the drying of the fuel cell, in particular in the case of fresh air suctioned in through the fuel-cell exhaust-gas line being used as purging gas, the device includes at least one condenser arranged in the fuel-cell exhaust-gas line. A condenser or water separator may alternatively or additionally also be provided at the fuel cell-outlet upstream of the branching point of the first bypass line.

The purging gas that is suctioned through the fuel cell can be delivered out via a fuel-cell exhaust-gas outlet. For example, the purging gas suctioned through the fuel cell can be delivered into the fuel-cell exhaust-gas line via a first bypass line or a fuel cell bypass (below, for simplicity, the expression "first bypass line" will be used). This has the advantage that components provided in the fuel-cell exhaust-gas line, such as for example the exhaust-gas system and/or the water separator, which are provided in any case for the normal or standard fuel cell operation, can also treat the purging gas correspondingly. Thus, a situation is preferably prevented in which the moisture purged out of the fuel cell passes into the surroundings. Furthermore, the noise level can be reduced by way of the noise-reduction measures of the exhaust-gas system. Moreover, evaluation devices positioned downstream of the fuel cell, such as for example the device for determining the hydrogen concentration in the fuel-cell exhaust gas, can also be used for the purging gas. If, during the follow-on running, the purging gas is discharged through the fuel-cell exhaust-gas outlet that is utilized for standard operation, the hydrogen concentration in the fuel-cell exhaust-gas line is simultaneously reduced. It would, however, alternatively or additionally be possible for a purging-gas outlet, through which the gas escapes into the surroundings, to also be provided upstream of the delivery device.

In particular, the purging gas may also be suctioned in via the cathode-gas supply of the fuel cell. The purging gas may initially be filtered by the cathode-gas air filter of the fuel cell before being suctioned through the fuel cell. The cathode-gas air filter is the filter which, during the standard operation of the fuel cell, removes any contaminants and/or harmful gases from the gas that participates in the reaction on the cathode side of the fuel cell. Alternatively or in addition, it is contemplated for the purging gas to be filtered by a separate filter. The use of the cathode-gas air filter is, however, particularly preferable because, in this way, structural space, production costs and servicing costs can be reduced.

During the suctioning of purging gas upstream of the fuel cell, the purging gas may be suctioned in via the cathode-gas air filter in such a way that flow does not pass through the delivery device. During the suctioning of purging gas, the delivery device may be connected via at least one line to the fuel-cell exhaust-gas line, in such a way that the delivery device suctions in purging gas through the fuel cell. In the line downstream of the delivery device and upstream of the fuel cell, there is already generated a negative pressure which makes it possible for moisture to be condensed out. It is preferable for a water separator to be provided in the line between the fuel cell and the delivery device, in order that as little moisture as possible passes into the delivery device. The water separator is particularly preferably provided between the fuel cell and (first) multi-way valve that is arranged in the fuel-cell exhaust-gas line. It is thus possible for one water separator to be used for normal operation and for follow-on running.

It is possible for multiple multi-way valves to be provided, which may be arranged in the cathode-gas supply and/or in the fuel-cell exhaust-gas line, and designed, such that, during normal operation of the fuel cell, they conduct cathode gas to the fuel cell and discharge fuel-cell exhaust gas out of the fuel cell through the fuel-cell exhaust-gas line and/or through the fuel-cell exhaust-gas outlet. Furthermore, the multi-way valves may be arranged and designed such that, during the suctioning of purging gas, they conduct purging gas from the cathode air filter into the fuel cell and supply the purging gas, downstream of the fuel cell, to the delivery device, such that the delivery device suctions in filtered purging gas through the fuel cell.

Also described is the use of a delivery device, operated in a reversed delivery direction, for generating negative pressure in a fuel cell for the purposes of purging the fuel cell with purging gas.

The solutions according to the invention, and the refinements thereof, yield the following advantages:
An easily implementable and inexpensive method for the purging and drying of a fuel cell is provided.
The device including at least one fuel cell is highly suitable for a frost start.
The device can be provided with minimal structural modifications.
A simplification of the method implementation is possible merely by modification of the electronic control, even without structural modification of the device.
The existing components can be used for the treatment of the purging gas upstream and downstream of the fuel cell. Space requirement, production costs and servicing costs are reduced.
The existing safety systems can monitor the purging process.

Other objects, advantages and novel features of the present invention will become apparent from the following detailed description of one or more preferred embodiments when considered in conjunction with the accompanying drawings.

DETAILED DESCRIPTION OF THE DRAWINGS

The present invention will be discussed in detail in relation to the prior art on the basis of exemplary embodiments. The figures illustrate only those parts of the device according to the invention which are of interest here; for the sake of clarity, all other components have been omitted. Furthermore, the same reference designations are used to denote identical components.

Figure 1:
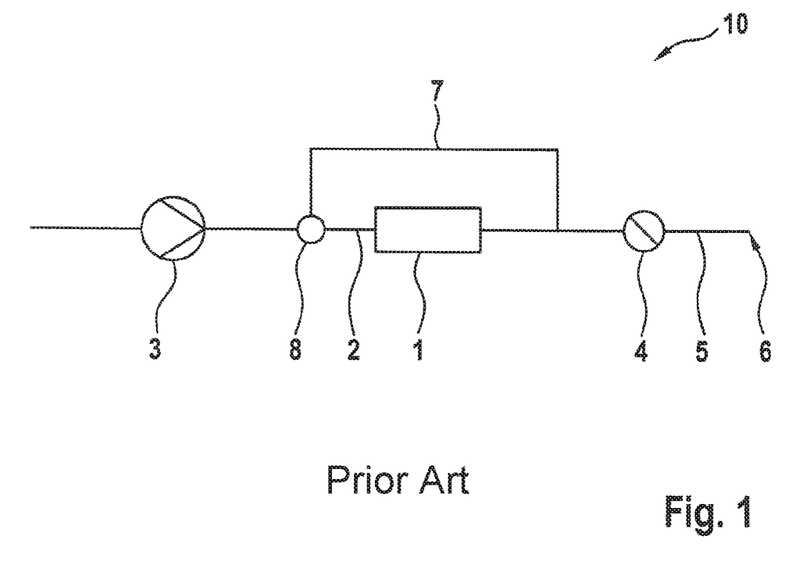
FIG. 1 is a schematic diagram of a detail of a device, including a fuel cell, according to the prior art.

FIG. 1 schematically shows a detail of a device 10, for example of a fuel cell system, which is operated in accordance with the prior art. The device 10 includes a fuel cell 1 which is connected, at its inlet, to a cathode-gas supply 2. Cathode gas is delivered to the fuel cell 1 via the cathode-gas supply 2 by way of a delivery device 3, in particular a compressor. Here, the delivery device 3 delivers the cathode gas such that it passes to the fuel cell 1 at elevated delivery pressure. A fuel-cell outlet is adjoined by a fuel-cell exhaust-gas line 5. At the end of the fuel-cell exhaust-gas line 5, the fuel-cell exhaust gas escapes from the device 10 into the surroundings via a fuel-cell exhaust-gas outlet 6. In the fuel-cell exhaust-gas line 5 there may be arranged a throttle flap 4 which regulates an amount of fuel-cell exhaust gas that is delivered out.

The device 10 furthermore includes a bypass line 7 which branches off from the fuel-cell exhaust-gas line 5 downstream of the fuel cell 1, bypasses the fuel cell 1 and opens, via a multi-way valve 8, into the cathode-gas supply 2 upstream of the fuel cell 1 and downstream of the delivery device 3.

In the event of deactivation of the device 10, that is to say during the so-called shut-down process of the fuel cell 1, purging gas is delivered via the cathode-gas supply 2 to the fuel cell 1 by way of the delivery device 3 that is operated in the normal direction, the fuel cell 1 is purged, and purging gas and water contained therein are delivered out via the fuel-cell exhaust-gas line 5 and the fuel-cell exhaust-gas outlet 6.

Figure 2:
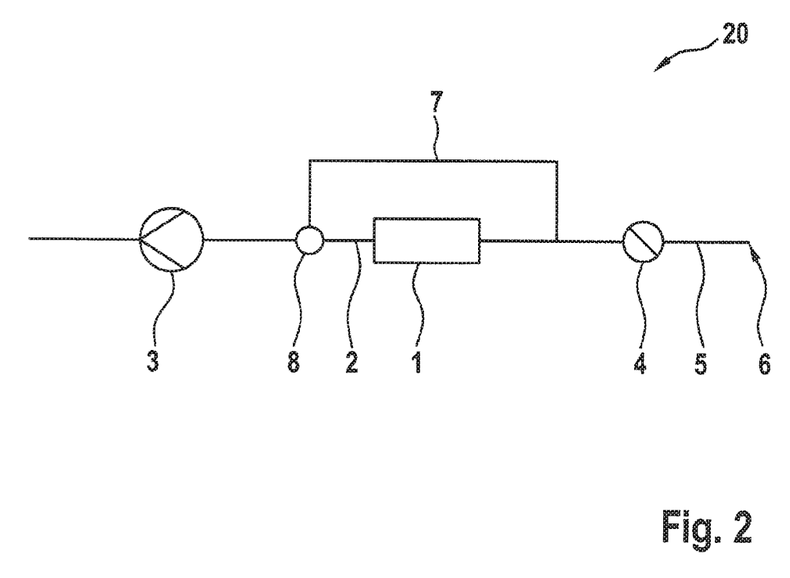
FIG. 2 is a schematic diagram of a detail of a device, including a fuel cell, according to a first advantageous refinement of the invention.

FIG. 2 shows a detail of a device 20 according to a first advantageous refinement of the invention. The device 20 is of identical construction to the device 10 from FIG. 1, that is to say includes all of the components in an analogous arrangement, it is merely the case that the delivery device 3 is operated in a reversed delivery direction. The delivery device may be electronically controlled, such that no structural measures have to be implemented on the device 20 in order to achieve an effective purging effect. The delivery device 3 thus generates a negative pressure. By way of the negative pressure, fresh air is suctioned in via the fuel-cell exhaust-gas outlet 6 and is delivered through the fuel-cell exhaust-gas line 5 and through the fuel cell 1. In this way, the fuel cell 1 is purged with fresh air, and water contained in the fuel cell 1 is removed therefrom. The purging gas humidified with the water contained in the fuel cell 1 is delivered out via the cathode-gas supply 2. The flow rate of purging gas, and the pressure level in the fuel cell 1, can be controlled in targeted fashion by way of the throttle flap 4.

Figure 3:
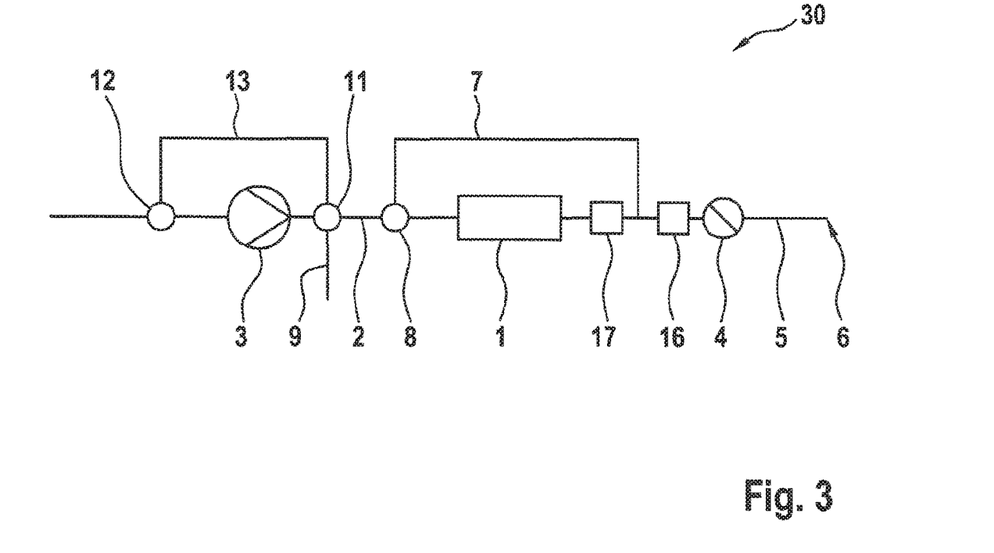
FIG. 3 is a schematic diagram of a detail of a device, including a fuel cell, according to a second advantageous refinement of the invention.

FIG. 3 shows a detail of a device 30 according to a second advantageous refinement of the invention. Here, the delivery device 3 is operated in the normal delivery direction known from the prior art. The upstream direction of the delivery device 3 is connected to the downstream direction thereof by way of a second bypass line 13. The bypass line 13 is connected to the cathode-gas supply 2 by way of two multi-way valves 11 and 12. On the multi-way valve 11 there is provided a purging-gas outlet 9, by way of which humidified purging gas that has been suctioned through the fuel cell 1 can be delivered out.

As has already been described for the device 20 from FIG. 2, fresh air is suctioned in via the fuel-cell exhaust-gas outlet 6 by way of the negative pressure generated by the delivery device 3, and the fresh air is delivered through the fuel cell 1 via the fuel-cell exhaust-gas line 5. Alternatively, it is also possible for a separate purging-gas supply (not shown) to be arranged in the fuel-cell exhaust-gas line 5, via which purging-gas supply fresh air can be suctioned in.

The fuel cell 1 can thus be purged with fresh air, and water contained in the fuel cell 1 can be removed therefrom. The purging gas humidified with the water contained in the fuel cell 1 is conducted via the cathode-gas supply 2 and is supplied, at the multi-way valve 11, to a second bypass line 13. Via the multi-way valve 12, the humidified purging gas passes into the cathode-gas supply 2, is conducted through the delivery device 3, and, via the multi-way valve 11, is discharged through the purging-gas outlet 9. The flow rate of purging gas, and the pressure level in the fuel cell 1, can be regulated in targeted fashion by way of the throttle flap 4.

It is possible for one or more condensers 16, 17 to be arranged in the fuel-cell exhaust-gas line 5, by way of which condenser(s) water can be removed from the fresh air that is suctioned in via the fuel-cell exhaust-gas line 5, before the fresh air passes through the fuel cell 1. The purging gas to be suctioned through the fuel cell 1 is thus pre-dried and can absorb a greater amount of water, which accelerates the drying process of the fuel cell 1.

Figure 4:
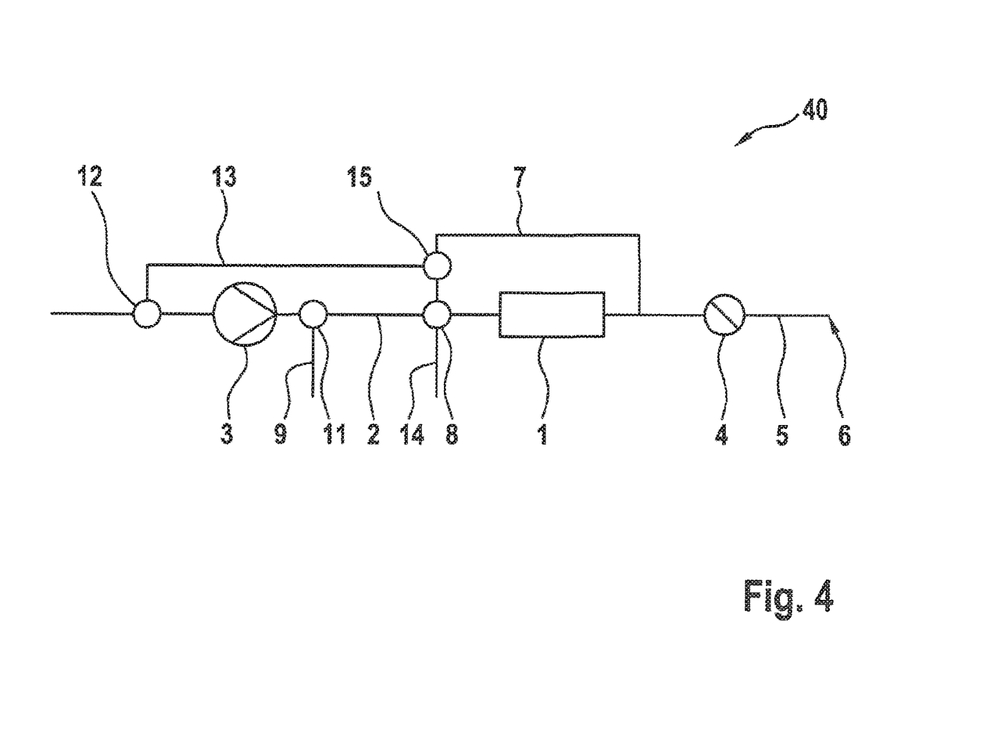
FIG. 4 is a schematic diagram of a detail of a device, including a fuel cell, according to a third advantageous refinement of the invention.

The device 40 according to the invention that is shown in FIG. 4 differs from the device 30 from FIG. 3 in that the first bypass line 7 and the second bypass line 13 can be coupled to one another by way of a multi-way valve 15. Furthermore, in the cathode-gas supply 2, there is provided a purging-gas supply 14, via which purging gas, and in particular fresh air, can be suctioned in. For this purpose, the throttle flap 4 is closed. The delivery device 3, which is operated in a normal delivery direction, thus suctions purging gas through the fuel cell 1 via the purging-gas supply 14. The purging gas humidified with the water contained in, and expelled from, the fuel cell 1 is suctioned into the cathode-gas supply 2 via the first bypass line 7 and the second bypass line 13 and the delivery device 3, and is discharged, at the multi-way valve 11, into the purging-gas outlet 9.

Figure 5A:
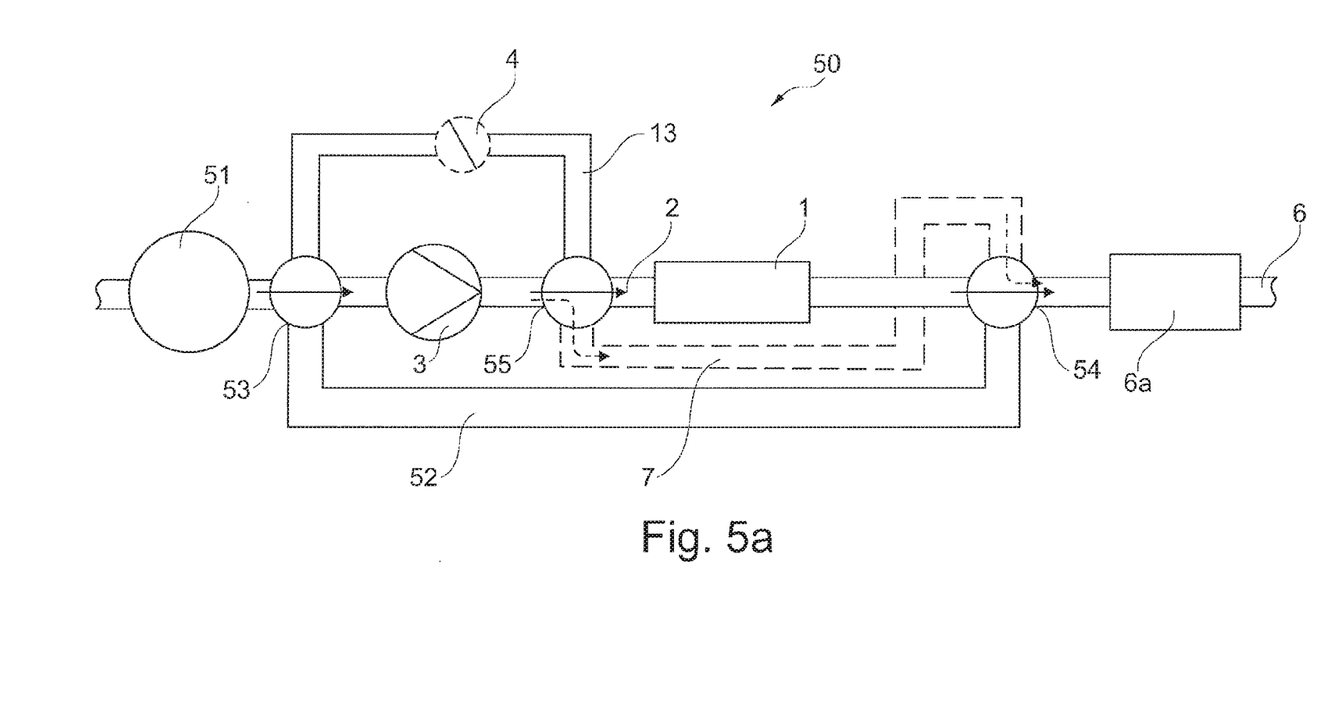
FIG. 5a is a schematic diagram of a detail of a device, including a fuel cell, according to a fourth advantageous refinement of the invention during normal operation.

FIG. 5a shows a device for the method disclosed herein, during standard operation. The cathode gas flows through the cathode air filter 51 and through the second multi-way valve 53 into the delivery device 3, in this case for example a compressor. The delivery device 3 compresses the cathode gas, which then flows through the third multi-way valve 55 into the fuel cell 1. The illustration does not show possible humidification means which may preferably be arranged between the third multi-way valve 55 and the fuel cell 1 in order to humidify the cathode gas before it enters the fuel cell 1. At the same time, during standard operation, cathode gas may flow through the fuel cell bypass (first bypass line) 7. A bypass 7 of this type and a bypass flow of this type are generally provided in any case for efficient operation of the fuel cell 1 and of the delivery device 3. The second multi-way valve 53 can, during normal operation, prevent a flow through the line 52 and/or through the second bypass line 13, if said function is not ensured by way of some other valve. Even though the delivery device 3, the second bypass line 13 and the second and third multi-way valves 53, 55 are shown as separate components in the schematic FIGS. 5a and 5b, it is preferable for one or more of the components to be jointly integrated in the delivery device 3.

The cathode gas which flows into the fuel cell 1 at least partially participates in the electrochemical reaction at the cathode before exiting the fuel cell 1 again as exhaust gas. Here, the exhaust gas then flows through the first multi-way valve 54 in order to then pass into the exhaust-gas system 6a. FIG. 5a does not show the water separator 16, which may preferably be arranged between the fuel cell 1 and the first multi-way valve 54. It is preferably the case that the first and/or the second multi-way valve 54, 55 also prevent a bypass flow through the lines 52, 13. It would, however, also suffice for only in each case one of the multi-way valves 53, 54, 55 to effect the blocking of the bypass lines 52, 13.

Figure 5B:
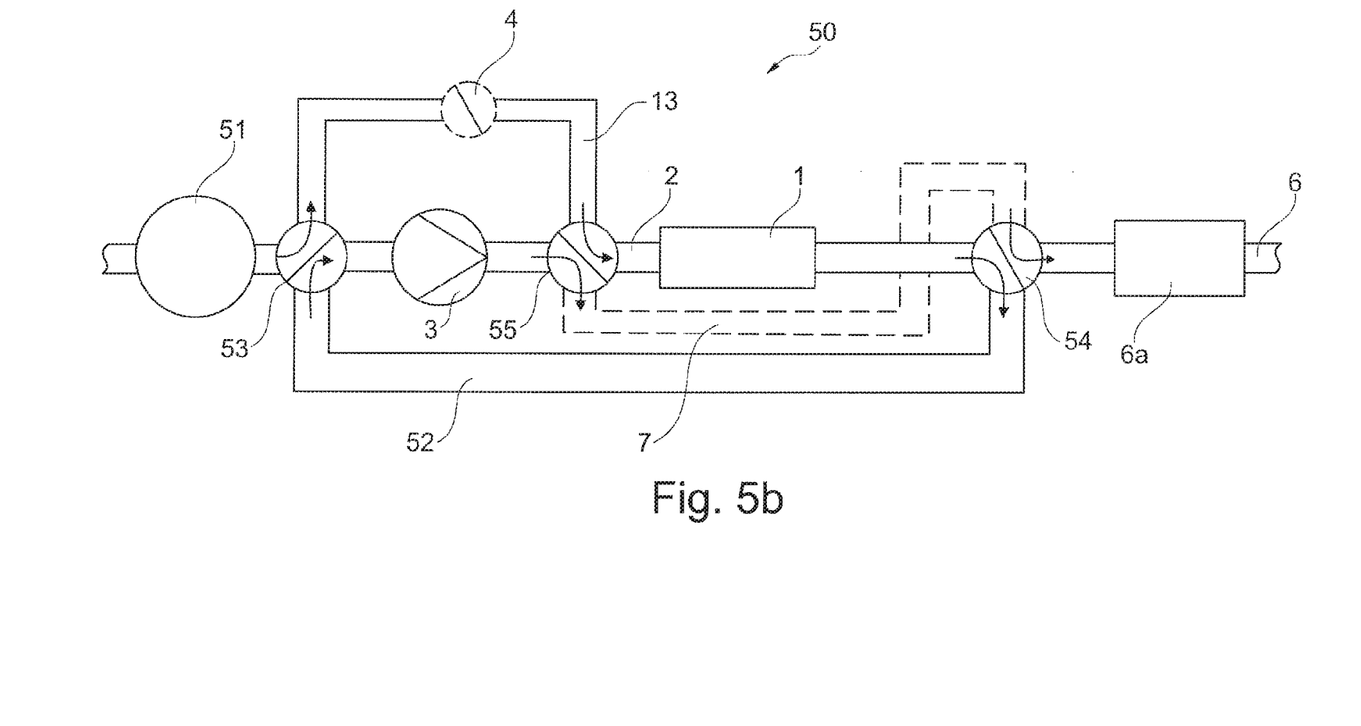
FIG. 5b is a schematic diagram of a detail of a fuel cell as per FIG. 5a during follow-on running.

FIG. 5b shows the device 50 as per FIG. 5a during the suctioning of purging gas (follow-on running). The second multi-way valve 53 is now switched such that purging gas passes through the cathode-gas filter 51 into the second bypass line 13. The direct throughflow of cathode gas from the filler 51 to the delivery device 3 is now prevented. The third multi-way valve 55 upstream of the fuel cell 1 is now switched such that it conducts purging gas from the second bypass line 13 into the fuel cell 1. Also, the direct connection between delivery device 3 and fuel cell 1 is preferably shut off by way of the third multi-way valve 55. Arranged downstream of the fuel cell 1 is the first multi-way valve 54, which, during follow-on running, conducts the purging gas downstream of the fuel cell 1 via the line 52 to the second multi-way valve 53. In the second multi-way valve 53, during the suctioning phase, the line 52, and thus the exhaust-gas side of the fuel cell 1, are fluidically connected to the delivery device 3. Thus, during the follow-on running, the delivery device 3 suctions purging gas out of the fuel cell 1 (see arrows). The delivery direction of the delivery device 3 does not have to be reversed for this purpose. Consequently, the impeller wheels of the delivery device 3 can be optimized for a single delivery direction. FIG. 5b does not show the water separator 16, which may be arranged downstream of the delivery device 3, preferably between the first multi-way valve 54 and the fuel cell. The water separator 16 reduces the moisture that could otherwise impinge on the delivery device 3. Here, downstream of the delivery device 3, the purging gas is supplied to the fuel-cell exhaust-gas line 5 (again) via the first bypass 7, in this case via the first multi-way valve 54. Subsequently, said purging gas escapes through the exhaust-gas system 6a. Alternatively, a further bypass may be provided which, during standard operation, is not used as a cathode bypass. It would also be possible for the purging gas to be directly discharged, upstream of the delivery device 3, through a purging-gas outlet 9 (not shown).

A throttle 4 is provided in the second bypass line 13. The suctioning effect or the negative pressure can be varied by way of the throttle 4 in conjunction with the delivery device 3. It would, however, likewise suffice if, in a preferred embodiment, the second bypass line 13 itself has such a small cross section that the second bypass line, owing to said small cross section, functions as a flow resistance which permits or promotes a negative pressure.

The above description of the present invention serves merely for illustrative purposes and not for the purposes of restricting the invention. Various changes and modifications are possible within the scope of the invention without departing from the scope of the invention and its equivalents.

LIST OF REFERENCE DESIGNATIONS:

1 Fuel cell
2 Cathode-gas supply
3 Delivery device
4 Throttle flap
5 Fuel-cell exhaust-gas line
6 Fuel-cell exhaust-gas outlet
7 First bypass line 8 Multi-way valve
9 Purging-gas outlet
10 Device
11 Multi-way valve
12 Multi-way valve
13 Second bypass line
14 Purging-gas supply
15 Multi-way valve
16 Condenser
17 Condenser
20 Device according to the invention
30 Device according to the invention
40 Device according to the invention
50 Device according to the invention
51 Air filter
52 Line
53 Second multi-way valve
54 First multi-way valve
55 Third multi-way valve The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for purging a fuel cell, the method comprising the acts of:

suctioning purging gas through the fuel cell, wherein
the suctioning of the purging gas through the fuel cell occurs via a negative pressure;
the purging gas is suctioned in via a fuel-cell exhaust-gas outlet or a purging-gas supply and the purging gas suctioned in via the fuel-cell exhaust-gas outlet or the purging-gas supply is delivered through a fuel-cell exhaust-gas line to the fuel cell.

2. The method according to claim 1, wherein, during the suctioning of the purging gas through the fuel cell, a delivery device for cathode gas is operated in a normal delivery direction.

3. The method according to claim 1, wherein, the purging gas suctioned through the fuel cell is delivered out via a purging-gas outlet provided in a cathode-gas supply of the fuel cell.

4. The method according to claim 1, wherein the negative pressure is generated by operating a delivery device of the fuel cell in a reverse direction.

5. The method according to claim 1, wherein
after deactivation of the fuel cell, a delivery direction is initially maintained for one to ten seconds.

6. The method according to claim 1, wherein water is condensed out of fuel cell exhaust air and/or out of the purging gas before suctioning the purging gas through the fuel cell via the negative pressure.

\* \* \* \* \*